Patented July 6, 1926.

1,591,630

UNITED STATES PATENT OFFICE.

CHARLES B. JACOBS, OF WILMINGTON, DELAWARE, ASSIGNOR TO E. I. DU PONT DE NEMOURS & COMPANY, OF WILMINGTON, DELAWARE, A CORPORATION OF DELAWARE.

METHOD OF REMOVING LIQUID FROM CYANIDES.

No Drawing.     Application filed February 24, 1921. Serial No. 447,540.

This invention relates to a method of removing liquid from masses of cyanide and, more particularly, it relates to the removing of mother liquor from masses of sodium cyanide to obtain substantially anhydrous sodium cyanide. It is the object of the invention to provide such a method and also to improve generally upon methods of the character indicated.

It is known that when crystallized sodium cyanide ($NaCN.2H_2O$) is melted in its water of crystallization above substantially 33.5° C., the transition point from hydrate to anhydrous sodium cyanide, about 41% of the cyanide contained in the crystals separates as anhydrous sodium cyanide; and its has been proposed to free the so-obtained "anhydrous" cyanide from the mother liquor by suction. Yet, as a matter of fact it is not feasible, if indeed it is possible, to wholly remove the mother liquor by suction. It would be impossible to dehydrate the mass by mere suction unless the suction were maintained for a time sufficient to pull air through the mass on the suction filter to an extent which would make the operation one of air-drying, and this air-drying operation would almost certainly result in the decomposition of cyanide through the action of the carbon dioxide in the air, or continuous removal of hydrocyanic acid or ammonia formed by hydrolysis of the wet cyanides. However, it is possible, I have found, to obtain, from melting crystallized sodium cyanide, containing about 42 to 44% of water, a product containing from 84 to 90% sodium cyanide, and from 16 to 10% of water in the form of mother liquor, by suction filtration, filter pressing, centrifugal separation, or the like, carrying out such operations at a temperature above the melting point of crystallized sodium cyanide as otherwise recrystallization would take place and the solid product contain a large excess of water. But a product containing any such percentages of water as those mentioned is not a properly marketable one as it rapidly deteriorates and decomposes; so, however valuable suction filtration and so forth may be in themselves, for example as intermediate steps in obtaining an anhydrous product, they cannot alone produce a marketable product.

Now, I have discovered that substantially all the liquid, e. g., mother liquor, can be removed from cyanide masses, e. g., the masses of "anhydrous" sodium cyanide obtained by melting sodium cyanide crystals, and filtering at a temperature above the transition point to reduce the water content to about 10 to 16%, by subjecting the mass to relatively high directly applied pressure, as by a hydraulic press. In this way I am readily and practicably able to obtain sodium cyanide containing substantially no water, i. e., .6% for example, in an operation requiring but a short time, for example somewhat less than a quarter of an hour, using easily obtainable pressures, say 2500 to 6000 pounds per square inch. During the pressing the temperature should, of course, be kept sufficiently high to ensure that the substance contained in the liquid will not deposit in the interstices of the cake. For example, in pressing the sodium cyanide mass obtained as aforesaid, the temperature should be kept above 33.5 C., e. g., 38°–40° C. to prevent cyanide crystallizing out of the mother liquor.

As giving results actually obtained, the following table is of interest. It will be understood that each of the five samples listed was taken from the same batch of original material from the suction filter and each contained substantially the same initial content of water—10.3%, so that although five samples were used, for convenience in analysis and so forth, the table for practical purposes presents the effects on a sample as the time of aplication of the pressure is increased. The cakes used were 1¾" thick (diameter 2 inches) and the pressure in each test was 2500 pounds per square inch, constantly applied:—

| Sample. | Time in minutes. | % NaCN. | % $H_2O$ by difference. | Weight of product per cu. ft. |
|---|---|---|---|---|
| 1 | 0 | 89.7 | 10.3 | Not determined. |
| 2 | 1 | 93.5 | 6.5 | Not determined (cake broke). |
| 3 | 4 | 96.3 | 3.7 | 88.2 lbs. |
| 4 | 8 | 98.3 | 1.7 | 89.7 lbs. |
| 5 | 12 | 99.4 | 0.6 | 92.1 lbs. |

(The weight per cubic foot of 100% NaCN, specific gravity 1.5, is 93.6 pounds).

As will be understood by those skilled in the art, the amount of pressure to be applied and the duration of its application will depend upon the thickness of the cake, the amount of contained liquid, etc. In the case of cakes of NaCN about 3¾ inches thick and initially containing 16.3% of water in the form of mother liquor, with the pressure applied for eleven minutes, 2500 pounds pressure has given about 94.3% cyanide; 4000 pounds about 96.8%; 6000 pounds about 98%, and so on. A pressure between 2500 and 6000 pounds per square inch, say 4000, is practical and should be generally satisfactory.

Any of the ordinary types of hydraulic press provided with a drainage head for supporting the cake and draining off the liquid and also provided with a holder, or series of holders, for forming the cake between the upper head and the lower, or drainage, head of the press, and with means for heating the cake, substantially such as a cocoa or powder press for example, may be used in carrying out the pressing. Any usual or desired type of apparatus may be used for melting the crystals, the initial removal of liquid, and, in general, taking the steps prior to the pressing.

It will be understood, of course, that although the removal, by filtering or the like, of a certain amount of the liquid prior to the pressing is indicated above, such initial removal may be omitted if preferred and the entire removal carried out by pressing. Also, it is evident that, should it be desired, the method may be used for the expulsion of less than substantially all the liquid; it is desirable however to reduce the water content of sodium cyanide to below substantially 5%. Also, it will be understood that although I have described the method with more particular reference to sodium cyanide that I do not confine it thereto. Although for convenience I have in certain of the claims referred to "filtration" it is to be understood that I do not thereby exclude centrifugal separation and similar operations as from the view point of the present invention they are but the equivalents of filtration, i. e. operations for feasibly and relatively quickly reducing the liquid content of the mass so that it may be the more readily and conveniently subjected to pressure.

I claim:—

1. The method of removing mother liquor from a sodium cyanide mass obtained by melting crystallized sodium cyanide in its water of crystallization which comprises subjecting the mass to directly applied relatively high pressure while maintaining the mass at a temperature above the transition point from the hydrate to anhydrous sodium cyanide.

2. The method of removing mother liquor from a sodium cyanide mass obtained by melting crystallized sodium cyanide in its water of crystallization which comprises subjecting the mass to directly applied relatively high pressure while maintaining the mass at a temperature above the transition point from the hydrate to anhydrous sodium cyanide, and continuing the application of the pressure until the water content of the mass is reduced to below substantially 5%.

3. The method of removing mother liquor from a sodium cyanide mass obtained by melting crystallized sodium cyanide in its water of crystallization which comprises, while maintaining the mass at a temperature above the transition point from the hydrate to anhydrous sodium cyanide, subjecting the mass to filtration until its mother-liquor content is substantially reduced and then subjecting the mass to directly applied relatively high pressure to further reduce the mother-liquor content.

4. The method of removing mother liquor from a sodium cyanide mass obtained by melting crystallized sodium cyanide in its water of crystallization which comprises, while maintaining the mass at a temperature above the transition point from the hydrate to anhydrous sodium cyanide, subjecting the mass to filtration until its water content is reduced to about 10 to 16%; and then subjecting the mass to directly applied relatively high pressure to further reduce the mother liquor content.

5. The method of removing mother liquor from a sodium cyanide mass obtained by melting crystallized sodium cyanide in its water of crystallization which comprises, while maintaining the mass at a temperature above the transition point from the hydrate to anhydrous sodium cyanide, subjecting the mass to filtration until its water content is reduced to about 10 to 16%; and then subjecting the mass to directly applied relatively high pressure and continuing the application of the pressure until the water content is reduced to below substantially 5%.

6. The method of removing mother liquor from a sodium cyanide mass obtained by melting crystallized sodium cyanide in its water of crystallization which comprises, while maintaining the mass at a temperature above the transition point from the hydrate to anhydrous sodium cyanide, subjecting the mass to filtration until its water content is reduced to about 10 to 16%; and then subjecting the mass to directly applied relatively high pressure and continuing the application of the pressure until the mass is substantially freed of mother liquor.

7. The method of removing mother liquor from a sodium cyanide mass obtained by melting crystallized sodium cyanide in its water of crystallization which comprises, while maintaining the mass at a temperature above the transition point from the hydrate to anhydrous sodium cyanide, subjecting the mass to filtration until its water content is reduced to about 10 to 16%; and then subjecting the mass to directly applied pressure of substantially 2500 to 6000 pounds per square inch and continuing the application of the pressure until the mass is substantially freed of mother liquor.

In testimony whereof I affix my signature.

CHARLES B. JACOBS.